United States Patent [19]

ta Huang et al.

[11] 4,191,986
[45] Mar. 4, 1980

[54] POWER LINE TRANSIENT SUPPRESSORS

[75] Inventors: Kwang ta Huang, Ventura; Brian R. Milner, Camarillo, both of Calif.

[73] Assignee: The United States of America as represented by the Secretary of the Navy, Washington, D.C.

[21] Appl. No.: 905,323

[22] Filed: May 12, 1978

[51] Int. Cl.² .............................................. H02H 3/08
[52] U.S. Cl. ...................................... 361/58; 361/111; 323/9
[58] Field of Search ................... 361/58, 43, 111, 110, 361/4, 9, 10, 11, 93; 323/6, 9, 44 R, 60, 87, 82, 85; 307/200 A

[56] References Cited

U.S. PATENT DOCUMENTS

| 1,770,334 | 7/1930 | Evans ........................................ 323/9 |
| 1,811,963 | 6/1931 | Peterson ................................. 323/9 X |
| 2,931,971 | 4/1960 | May ........................................... 323/6 |
| 3,047,746 | 7/1962 | Berkery ............................. 361/111 X |
| 3,099,789 | 7/1963 | Perrins ..................................... 323/9 |

FOREIGN PATENT DOCUMENTS

| 212534 | 11/1940 | Fed. Rep. of Germany ............. 323/9 |
| 2224259 | 5/1973 | Fed. Rep. of Germany ............ 361/58 |
| 358083 | 9/1931 | United Kingdom ..................... 323/87 |

Primary Examiner—Patrick R. Salce
Attorney, Agent, or Firm—Richard S. Sciascia; Joseph M. St. Amand

[57] ABSTRACT

Power line transient suppressing circuits which use inductors in series with the load to reject or attenuate transients on the power line over a wider range of transients than with prior devices, and also serve as inrush current limiters. Two unidirectional current circulating diode-inductor loop circuits eliminate the 60Hz voltage drop across the inductors. Normal operation is not affected by the circuits, but transients are rejected by the inductors.

5 Claims, 5 Drawing Figures

POWER LINE TRANSIENT SUPPRESSORS

BACKGROUND OF THE INVENTION

The purpose of the invention is to achieve improved characteristics for AC power supplied to sensitive, sophisticated electronic equipment in order to protect such equipment from possible damage or malfunction caused by power supply anomalies.

A variety of methods have been employed in trying to protect certain electrical loads from transients that occur in the power supply. Many current methods of suppressing transients employ Zener diodes and metal oxide varistors. The small size of these devices limits their energy absorption capability and hence limits their ability to suppress large transients. The high cost of large Zener diodes is another disadvantage. Also, spark gaps are used to provide a short circuit when high voltage transients occur, but these are not effective against transients below 500 volts. Similarly, most prior methods are ineffective against varying types of transients.

SUMMARY OF THE INVENTION

The power line transient suppressing circuits described herein use inductors, together with diodes, for example, in series with a load to reject or attenuate voltage transients which occur in the power line supplying the load. The mere use of inductors is not new, nor is the use of diodes (i.e. one-way electrical valve means); however, the transient suppressing circuits of the present invention involve an arrangement of inductors together with diodes which have proven to be very effective against a much wider range of transients than provided by prior methods. The new circuits will suppress small transients of any voltage that is higher than the AC power line voltage, as well as large transients of high energy. In addition, the invention serves as an inrush current limiter. In the event of a short circuit of the load, the current rise will be slowed or delayed by the circuit. In general, the transient suppressing circuits use inductors in series with the load together with diodes to provide unidirectional current circulating loops for eliminating the 60 cycle voltage drop across the inductor. Thus, in normal operation, the voltage across the load will only be affected minimally or not at all by inserting the suppressor in the power line. As a transient occurs at the power source, the the inductor, or inductors, will reject it and the load will experience little or no transient.

DESCRIPTION OF THE PREFERRED EMBODIMENTS

The power line transient suppressing circuits, as shown in FIGS. 1, 2, 3 and 4 use inductors in series with the load to reject or attenuate voltage transients which occur in the power line from the AC source supplying the load. The transient suppressing circuit is, generally, comprised of two unidirectional current circulating diode-inductor loop circuits which eliminate the 60 Hz voltage drop across the inductors. The inductors may or may not be mutually coupled as in FIG. 1 and FIG. 2 depending upon the circuit losses which can be tolerated and the load protection required. During steadstate or normal load conditions, there is a DC circulating loop current loop flowing through each inductor, but no AC voltage drop across the inductors, and the voltage across the load is affected minimally or not at all by inserting the suppressor in the power line. As a transient above the nominal power line voltage occurs in the power line, the inductance of the suppressor will resist any sudden change in the line current and reject the transient. The transient voltage will be absorbed across the inductors so that the load will experience little or no transient.

Figure 4:
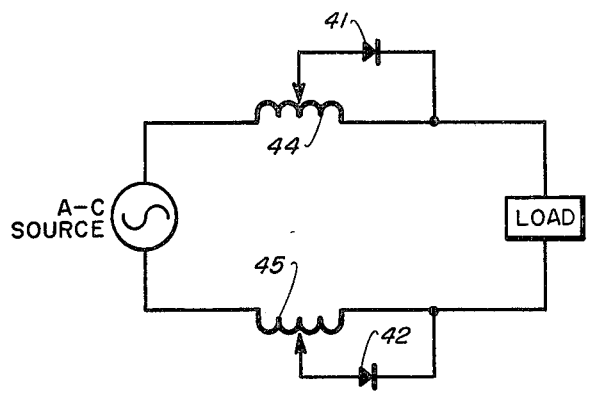
FIG. 4 is still another embodiment of the invention using autotransformers to reduce the voltage to which the diodes in the circuit are subjected without destroying the protection provided against transients.
Figure 5:
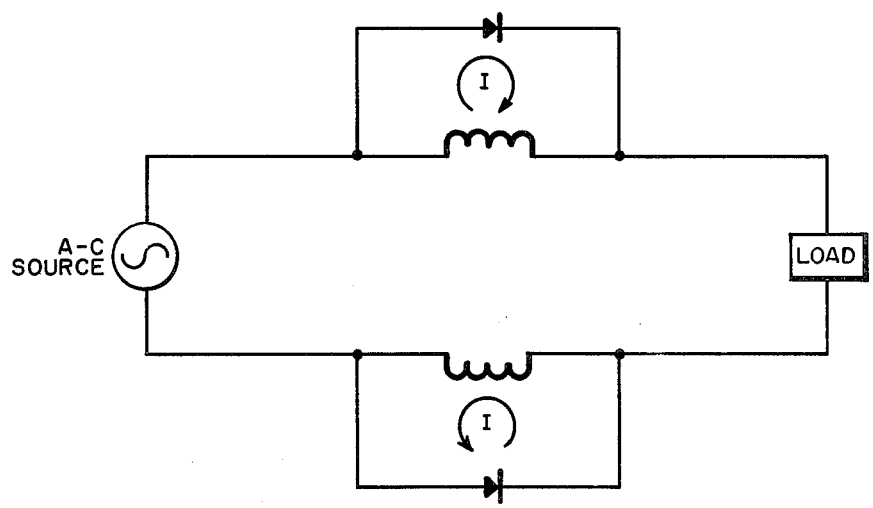
FIG. 5 illustrates a prior art transient suppressor circuit.

A prior art transient suppressor circuit is shown in FIG. 5. In the prior art circuit of FIG. 5, the inductor loops have a continuous circulating DC current during normal operation. However, the circuits of FIGS. 1 and 2 either eliminate or reduce this problem. Also, in the prior art circuit of FIG. 5, the diodes are exposed to the full transient voltages which occur across the inductors. The circuits of FIGS. 3 & 4 either reduce or eliminate this problem. The new circuits disclosed herein are effective against a much wider range of transients than the old methods. They will suppress small transients of any voltage that is higher than the AC power line voltage, as well as large transients of high energy. In addition, the new circuits also serve as inrush current limiters. In the event of a short circuit of the load, the current rise will be slowed or delayed by the transient suppressor circuit.

Figure 1:
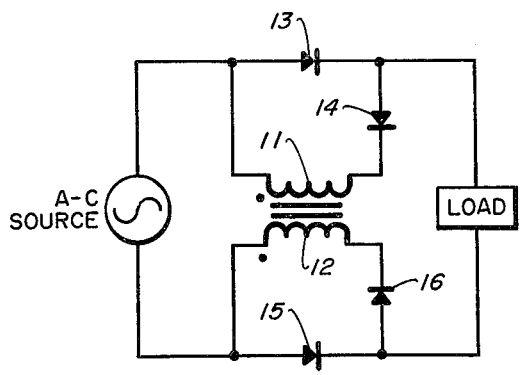
FIG. 1 is a circuit diagram showing one embodiment of the invention using mutually coupled inductors.

In FIG. 1 inductors 11 and 12 are magnetically coupled, as shown. Diodes 13 and 14, and 15 and 16, together with the coupling polarity of inductors 11 and 12, are arranged such that during each half-cycle the circulating current set up in an inductor during the previous half-cycle is counteracted and reduced to zero. For example, if during a given half-cycle a clockwise-circulating current is established in the loop of inductor 11, then during the next half-cycle, before a counterclockwise circulating current can be established in the loop of inductor 12, the current in the loop of inductor 11 will be reduced to zero due to the magnetic coupling of the two inductors. Thus, the situation of having continuous circulating currents in both inductor loops (as occurs in the circuit of FIG. 5) is avoided. The diodes in the inductor loop circuits of FIG. 1 ensure that the currents in the two loops will be counter-active, or "bucking," only and cannot circulate in the aiding direction.

Figure 2:
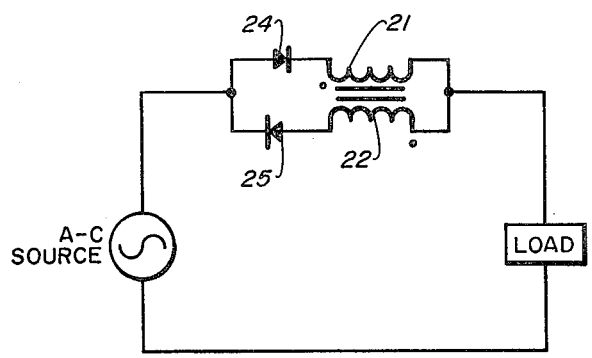
FIG. 2 shows a different embodiment of the invention where the inductors are in a coupled arrangement.

The circuit of FIG. 2 acts in a manner similar to that of FIG. 1 with respect to the coupling of the inductors such that the inductor currents are reduced to zero during alternate half-cycles, thereby avoiding continuous circulating currents. The circuit arrangement of FIG. 2 requires only two diodes, 24 and 25, arranged as shown.

It is well known that the continuous circulating loop currents produced by the prior art circuitry shown in FIG. 5 cause a small but finite power loss (I²R). This small loss is normally considered a desirable trade-off to achieve the required transient protection of the load. However, the mutual coupling of the two inductors in each of the circuits of FIGS. 1 and 2 results in a significant reduction in such DC power loss without impairing the load protection capability of the circuits.

Figure 3:
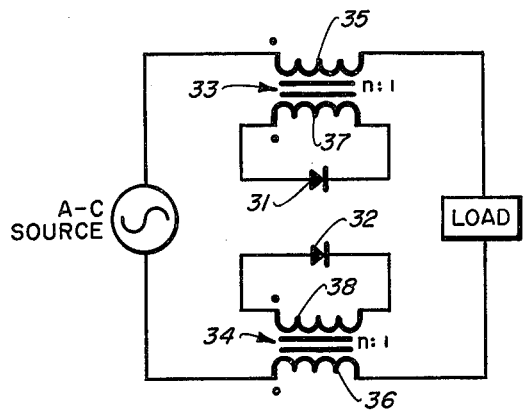
FIG. 3 is a circuit diagram of still another embodiment of the invention wherein magnetically coupled transformers are used in order to also protect the vulnerability of diodes in the circuit.

The transient suppressor circuit shown in FIG. 3 differs from the prior art device of FIG. 5 in that diodes 31 and 32 are connected across the inductors by means of transformers 33 and 34. The primary coils 35 and 36 of the transformers are the inductors connected in series with the load and diodes 31 and 32 are connected across the secondary coils 37 and 38, respectively. Transformers 33 and 34 preferably are step-down transformers such that when a transient voltage occurs across an inductor (i.e. transformer primary) such as inductor 35, for example, it is substantially reduced in magnitude so as not to be damaging to diode 31; the same holds true as well for inductor 36 and diode 32.

The polarity of diode 31 with respect to the polarity of transformer 33 windings 35 and 37, and the polarity of diode 32 with respect to the polarity of transformer 34 windings 36 and 37 are such that when current flows through the load in one direction during any given half-cycle, diode 31, for example, will permit current to flow in secondary 37 by virtue of the coupling with primary 35, whereas diode 32 will oppose any current which would tend to flow in winding 38 by virtue of the coupling with primary 36. When current flows through the load in the opposite direction, diode 32 will permit current to flow in secondary 38 by virtue of the coupling with primary 36, whereas diode 31 will oppose any current which would tend to flow in secondary 37 by virtue of the coupling with primary 35.

In the circuit of FIG. 4 the diodes 41 and 42 are each connected across only a portion of respective inductors 44 and 45 in such a manner that the inductor is used as an autotransformer. Thus, if a transient voltage spike occurs and a high voltage appears across the inductor, only a fraction of that voltage will be applied across the diode, thereby protecting the diode from damaging high voltage spikes that can occur in circuit arrangements such as found in the prior art circuit of FIG. 5.

The transient-suppressing capability of transient suppressor circuits is limited by the vulnerability of the diodes to excessive transient voltages. The circuits shown in FIG. 3 and FIG. 4 greatly improve the capability of transient suppressor circuits by reducing the voltage to which the diodes are subjected without destroying the protection provided. This diode transient voltage reduction is achieved by using voltage reducing (step-down) transformers as the inductors. These transformers may be either magnetically coupled transformers as in FIG. 3 or autotransformers as in FIG. 4. It is recognized that these two circuits, which lower the voltage to which the diodes are subjected, also increase the circulating loop currents and the resulting power loss. This, however, may be a desirable trade-off for applications in which excessively high voltage transients are anticipated. The circuits of this invention are effective against a much wider range of transients than the old methods. They will suppress small transients of any voltage that is higher than the AC power line voltage, as well as large transients of high energy.

Obviously, many modifications and variations of the present invention are possible in the light of the above teachings. It is therefore to be understood that within the scope of the appended claims the invention may be practiced otherwise than as specifically described.

What is claimed is:

1. In an electrical circuit having a first pair of terminals connected to an input source of AC electrical energy and a second pair of terminals connected to a load which is energized by said AC energy source, the improvement comprising a transient energy suppression circuit, connected in series with the load for rejecting or attenuating voltage transients which occur in circuit power lines to the load, and which comprises:
   a. a first and a second inductor means connected in series with the load;
   b. a first and a second one-way electrical valve means connected in series with said first and second inductor means, respectively, permitting current to flow in one direction only through each of said first and said second inductor means alternately during alternate half-cycles of energy from said AC source;
   c. said first and second inductor means being magnetically coupled together;
   d. said first and said second inductor means connected together in series with respective said first and said second one-way electrical valve means comprising:
      said first inductor means and a first diode in series connected in parallel with said second inductor means and a second diode in series;
      the series connections being of the same polarity and the parallel connections being of reverse polarity;
      said magnetic coupling of said first and said second inductors and the connection arrangement resulting in inductor currents being reduced to zero alternately in said first and second inductors during alternate half-cycles thereby avoiding continuous circulating currents simultaneously in both inductors;
   e. said circuit operating to attenuate and absorb energy caused by high transient voltages that may occur due to power supply anomalies, thereby protecting the load.

2. A transient suppressor circuit as in claim 1 wherein each said one-way electrical valve means is a diode.

3. In an electrical circuit having a first pair of terminals connected to an input source of AC electrical energy and a second pair of terminals connected to a load which is energized by said AC energy source, the improvement comprising a transient energy suppression circuit, connected in series with the load for rejecting or attenuating voltage transients which occur in circuit power lines to the load, and which comprises:
   a. a first and a second inductor means connected in series with the load;
   b. first and second one-way electrical valve means electrically connected across at least a portion of said first and second inductor means, respectively, to form respective opposing first and second unidirectional current circulating loop circuits;
   c. said first and second inductor means comprising first and second step-down transformers, respectively; the primary of each transformer being connected in series with the load, and the secondary of said first and second transformer being connected across said first and second one-way electrical valve means, respectively, forming respective first and second loop circuits each including a transformer secondary and a one-way electrical valve means;

d. the polarity of said diodes and the polarity of said transformer connections being such that when current is flowing to the load in any one given direction, one diode will permit induced current to flow in the transformer secondary included in its respective loop circuit by virtue of the polarity of the coupling with its respective transformer primary and the other diode will oppose current flow in the transformer secondary included in its respective loop circuit by virtue of the polarity of the coupling with its respective transformer primary;

e. the arrangement and polarity of connections of each said inductor means with respect to said one-way electrical valve means in each of said loop circuits permitting only a substantially reduced amount of any transient voltage occurring across said first and second inductor means to be applied across respective said one-way electrical valve means for protecting said valve means from damaging high voltage transients.

4. A transient suppressor circuit as in claim 3 wherein each said one-way electrical valve means is a diode.

5. In an electrical circuit having a first pair of terminals connected to an input source of AC electrical energy and a second pair of terminals connected to a load which is energized by said AC energy source, the improvement comprising a transient energy suppression circuit, connected in series with the load for rejecting or attenuating voltage transients which occur in circuit power lines to the load, and which comprises:

a. a first and a second inductor means connected in series with the load;

b. a first and a second one-way electrical valve means connected in series with said first and second inductor means, respectively, permitting current to flow in one direction only through each of said first and said second inductor means alternately during alternate half-cycles of energy from said AC source;

c. said first and second inductor means being magnetically coupled together;

d. said first and second inductor means together with said respective first and second one-way electrical valve means forming first and second unidirectional current circulating diode-inductor loop circuits;

e. each of said first and said second one-way electrical valve means comprising a pair of diodes, such that each of said first and said second unidirectional current circulating diode-inductor comprises:

an inductor in series with a first diode;

a second diode connected across said series connected inductor and first diode, and being in series with the load;

the polarity of said second diode being the same as the polarity of the first diode in each said loop circuit and the polarities in reverse as connected to the load;

said first and second loop circuits connected in series with said load being reversely connected, polarity wise, with respect to each other such that circulating current set up in one inductor loop circuit, during one half-cycle of any given cycle of AC energy, is reduced to zero before a counter circulating current can be established in the other inductor loop circuit due to the mutual coupling of said inductors, whereby continuous circulating currents simultaneously in both inductor loop circuits is avoided;

f. said circuit operating to attenuate and absorb energy caused by high transient voltages that may occur due to power supply anomalies, thereby protecting the load.

* * * * *